US008585818B1

(12) United States Patent
Jones

(10) Patent No.: US 8,585,818 B1
(45) Date of Patent: Nov. 19, 2013

(54) COATED PERLITE FLAKES

(71) Applicant: BASF SE, Ludgwigshafen (DE)

(72) Inventor: Steven Alan Jones, Budd Lake, NJ (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/804,960

(22) Filed: Mar. 14, 2013

(51) Int. Cl.
*C09C 3/06* (2006.01)
*C09C 1/00* (2006.01)
*C09C 1/24* (2006.01)
*C09C 1/36* (2006.01)
*B05D 5/06* (2006.01)

(52) U.S. Cl.
USPC .......... 106/439; 106/31.9; 106/415; 106/441; 427/215; 427/218; 524/413

(58) Field of Classification Search
USPC ......... 106/415, 439, 441, 31.9; 427/215, 218; 524/413
See application file for complete search history.

(56) References Cited

U.S. PATENT DOCUMENTS

| | | | | |
|---|---|---|---|---|
| 3,874,890 | A * | 4/1975 | Bernhard et al. | 106/418 |
| 3,926,659 | A * | 12/1975 | Bernhard et al. | 106/418 |
| 4,344,987 | A * | 8/1982 | Ostertag et al. | 427/213 |
| 4,456,486 | A * | 6/1984 | Bernhard | 106/417 |
| 4,457,784 | A * | 7/1984 | Bernhard | 106/417 |
| 4,482,389 | A * | 11/1984 | Franz et al. | 106/417 |
| 4,494,993 | A * | 1/1985 | Bernhard et al. | 106/417 |
| 4,509,988 | A * | 4/1985 | Bernhard | 106/418 |
| 4,537,636 | A * | 8/1985 | Bernhard et al. | 106/417 |
| 4,544,415 | A * | 10/1985 | Franz et al. | 106/417 |
| 4,552,593 | A * | 11/1985 | Ostertag | 106/417 |
| 4,565,581 | A * | 1/1986 | Bernhard | 106/417 |
| 4,623,396 | A * | 11/1986 | Kimura et al. | 106/417 |
| 4,948,631 | A * | 8/1990 | Ostertag et al. | 427/218 |
| 4,978,394 | A * | 12/1990 | Ostertag et al. | 106/404 |
| 5,271,771 | A * | 12/1993 | Franz et al. | 106/474 |
| 5,332,767 | A * | 7/1994 | Reisser et al. | 523/209 |
| 5,496,674 | A * | 3/1996 | Adel et al. | 430/111.31 |
| 5,614,346 | A * | 3/1997 | Adel et al. | 430/111.3 |
| 5,624,486 | A * | 4/1997 | Schmid et al. | 106/404 |
| 5,733,364 | A * | 3/1998 | Schmid et al. | 106/403 |
| 5,733,658 | A * | 3/1998 | Schmid et al. | 428/404 |
| 5,759,255 | A * | 6/1998 | Venturini et al. | 106/418 |
| 5,931,996 | A * | 8/1999 | Reisser et al. | 106/404 |
| 6,395,149 | B1 | 5/2002 | Palmgren | 204/192.29 |
| 6,630,018 | B2 * | 10/2003 | Bauer et al. | 106/415 |
| 7,172,812 | B2 * | 2/2007 | Greiwe et al. | 428/403 |
| 7,485,183 | B2 * | 2/2009 | Hochstein et al. | 106/499 |
| 2010/0203093 | A1 * | 8/2010 | Bujard et al. | 424/401 |
| 2010/0322981 | A1 * | 12/2010 | Bujard et al. | 424/401 |
| 2011/0118384 | A1 * | 5/2011 | Bugnon et al. | 523/171 |
| 2011/0237683 | A1 * | 9/2011 | Schmid et al. | 514/770 |
| 2011/0269845 | A1 * | 11/2011 | Bujard et al. | 514/770 |
| 2012/0027993 | A1 * | 2/2012 | Schmid et al. | 428/141 |
| 2012/0237577 | A1 * | 9/2012 | Sioss et al. | 424/401 |
| 2012/0282311 | A1 * | 11/2012 | Schmid et al. | 424/401 |

FOREIGN PATENT DOCUMENTS

| | | | |
|---|---|---|---|
| DE | 1467468 A1 * | 12/1968 | |
| DE | 1959988 A1 * | 6/1971 | |
| DE | 2009566 B1 * | 11/1971 | |
| DE | 2214545 A1 * | 10/1972 | |
| DE | 2215191 A1 * | 10/1972 | |
| DE | 2244298 A1 * | 3/1974 | |
| DE | 2313331 A1 * | 9/1974 | |
| DE | 2522572 A1 * | 12/1976 | |
| DE | 3137808 A1 * | 3/1983 | |
| DE | 3137809 A1 * | 3/1983 | |
| DE | 3151343 A1 * | 7/1983 | |
| DE | 3151354 A1 * | 7/1983 | |
| DE | 3151355 A1 * | 7/1983 | |
| DE | 3211602 A1 * | 10/1983 | |
| DE | 3235017 A1 * | 3/1984 | |
| DE | 3433657 A1 * | 3/1985 | |
| DE | 3334598 A1 * | 4/1985 | |
| DE | 4030727 A1 * | 4/1992 | |
| DE | 4125134 A1 * | 2/1993 | |
| DE | 4140900 A1 * | 6/1993 | |
| DE | 4403678 A1 * | 8/1995 | |
| DE | 19501307 A1 * | 7/1996 | |
| DE | 19516181 A1 * | 11/1996 | |
| DE | 19843014 A1 * | 3/2000 | |
| DE | 102005025609 A1 * | 2/2006 | |
| EP | 0045851 A1 * | 2/1982 | |
| EP | 0106235 A1 * | 4/1984 | |
| EP | 0332071 A1 * | 9/1989 | |

(Continued)

OTHER PUBLICATIONS

English language machine-generated translation for DE102005025609 (29 pages); 2006.*
English language machine-generated translation for DE2009566 (46 pages); 1971.*
English language machine-generated translation for DE19843014 (16 pages); 2000.*
Leach, R.H., editor, "The Printing Ink Manual", 4th edition, Van Nostrand Reinhold (International) Co. Ltd., London, 1988, pp. 282-591.*
Hare, C.H., "Protective Coatings", Technology Publishing Co., Pittsburgh, 1994, pp. 63-288.*
Raab, W. And U. Kindl, "Pflegekosmetik", Gustav-Fischer-Verlag Stuttgart, New York, 1991, pp. 158-184.*
English language translation of Raab, W. and U. Kindl, "Pflegekosmetik", Gustav-Fischer-Verlag Stuttgart, New York, 1991, p. 161.*

*Primary Examiner* — Anthony J Green
(74) *Attorney, Agent, or Firm* — Anna-lisa Gallo

(57) ABSTRACT

The present disclosure relates to a method of making coated perlite flakes comprises: (i) providing perlite flakes; (ii) applying a layer of tin oxide on the perlite flakes to obtain tin oxide coated perlite flakes; (iii) applying a layer titanium dioxide on the tin oxide coated perlite flakes obtained in step (ii) to obtain titanium dioxide and tin oxide coated perlite flakes; and (iv) applying a layer of iron oxide to the titanium dioxide and tin oxide coated perlite flakes to obtain the coated perlite flakes. The present disclosure also relates to coated perlite flakes comprising: perlite flakes with layer of tin oxide, then a layer of titanium dioxide, and then a layer of iron oxide.

27 Claims, 7 Drawing Sheets

(56) References Cited

FOREIGN PATENT DOCUMENTS

| | | | | |
|---|---|---|---|---|
| EP | 0338428 | A1 | * | 10/1989 |
| EP | 0649886 | A2 | * | 4/1995 |
| EP | 0668329 | A2 | * | 8/1995 |
| EP | 0707050 | A2 | * | 4/1996 |
| EP | 0735114 | A1 | * | 10/1996 |
| EP | 1469042 | A2 | * | 10/2004 |
| GB | 978200 | A | * | 12/1964 |
| GB | 1287225 | A | * | 8/1972 |
| GB | 1348878 | A | * | 3/1974 |
| GB | 1359933 | A | * | 7/1974 |
| GB | 1533430 | A | * | 11/1978 |
| WO | WO 9308237 | A1 | * | 4/1993 |
| WO | WO 9319131 | A1 | * | 9/1993 |
| WO | WO 9729059 | A1 | * | 8/1997 |
| WO | WO 9853001 | A1 | * | 11/1998 |
| WO | WO 9957204 | A1 | * | 11/1999 |
| WO | WO 0211882 | A1 | * | 2/2002 |
| WO | WO 03006558 | A2 | * | 1/2003 |
| WO | WO 2006110359 | A2 | * | 10/2006 |
| WO | WO 2006131472 | A2 | * | 12/2006 |
| WO | WO2012/013663 | A2 | * | 2/2012 |

* cited by examiner

COATED PERLITE FLAKES

FIELD OF THE INVENTION

The present invention relates to effect pigments that are coated perlite flakes comprising perlite flakes with layer of tin oxide, then a layer of titanium dioxide, and then a layer of iron oxide.

BACKGROUND OF THE INVENTION

Effect pigments are based on the use of a laminar substrate such as mica or perlite flakes which have been coated with metal oxide layer(s). These pigments can exhibit pearl-like luster as a result of reflection and refraction of light, and depending on the thickness of the metal oxide layer, they can also exhibit interference color effects.

DE102005025609 discloses non-metallic pigment mixtures with high metal brightness, useful e.g., in cosmetic, lacquers and colors, comprising gold color interference pigments and further pigments of silver-white, silver-gray and black-gray interference pigments.

EP1469042 discloses a pigment mixture comprising component A containing glass flakes based effect pigment(s) and component B containing organic and/or inorganic flake-form, needle-shaped, spherical or crystalline colorants and/or fillers. The admixture of one or more colorants to the coated glass flakes enables a rainbow effect to be imparted on the application systems, increases the color effect and achieves novel color effects.

WO2006110359 relates to an effect pigment comprising a synthetic platelet coated with a translucent metal oxide film, said synthetic platelet having a size distribution characterized as a $D_{10}$ of at least 9.5 microns, a $D_{50}$ of between about 20 and less than 40 microns, and a $D_{90}$ of over 35 to less than 85 microns. The metal oxide film can comprise titanium dioxide, or iron oxide. The synthetic platelet is selected from aluminum oxide, silicon dioxide, bismuth oxychloride, boron nitride, and glass. WO2006110359 teaches how to modify the particle size distribution of a pigment in order to optimize sparkle effect.

Methods currently known in the art to make iron oxide coated perlite flakes and standard methods of coating mica and glass flakes with iron oxide are not effective because the iron oxide layer easily strips off of the substrate resulting in an undesirable product.

Accordingly, there is still a need in the art for effect pigments with high sparkle effect (i.e., no stripping of iron oxide from the substrate) that are still economical to produce.

It is thus an object of this invention to provide an effect pigment that has improved chromaticity and sparkle. It is another object of the present invention to develop effect pigments on the basis of a natural substrate (i.e., perlite flakes) that would exhibit advantages such as good application properties in a variety of compositions, environmental compatibility, and simple handling in conjunction with realizing superior optical effects, i.e., high sparkle effect.

SUMMARY OF THE INVENTION

According to one embodiment of the present invention, provided herein is a method of making coated perlite flakes comprising: (i) providing perlite flakes; (ii) applying a layer of tin oxide on the perlite flakes to obtain tin oxide coated perlite flakes; (iii) applying a layer titanium dioxide on the tin oxide coated perlite flakes obtained in step (ii) to obtain titanium dioxide and tin oxide coated perlite flakes; and (iv) applying a layer of iron oxide to the titanium dioxide and tin oxide coated perlite flakes to obtain the coated perlite flakes.

According to another embodiment of the present invention, provided herein are coated perlite flakes comprising: perlite flakes with layer of tin oxide, then a layer of titanium dioxide, and then a layer of iron oxide.

According to yet another embodiment of the present invention, provided herein is a method of making coated perlite flakes comprising: (i) preparing a slurry of water and perlite flakes having a $D_{50}$ in the range of 10 μm to 50 μm; (ii) heating the slurry obtained in step (i) to a temperature of from about 70° C. to about 100° C. and adjusting the pH of the slurry to between about 1 and 3; (iii) after step (ii), adding a solution of a tin salt to the slurry while maintaining the pH at between about 1 and 4; (iv) after step (iii), stirring the slurry for at least 30 minutes; (v) after step (iv), adding a titanium salt solution to the slurry while maintaining the pH between about 1 and 4; (vi) after step (v), adding a solution of an iron salt to the slurry while maintaining the pH at between about 1 and 4; and (vii) after step (vi), filtering, then washing, and then calcining the slurry at from about 500° C. to about 1000° C. to obtain the coated perlite flakes.

These and other objects and advantages of the present invention shall be made apparent from the accompanying drawings and the description thereof.

DETAILED DESCRIPTION OF THE INVENTION

Figure 1:
FIG. 1 is an optical micrograph showing well coated perlite flakes of Example 1.

In the past, sparkling of effect pigments has been described in a descriptive manner while relying heavily on subjectivity. Subjective classification of the "sparkle" of effect pigments was not clear due to the quantitative description of sparkling effects. To address this issue, measuring devices have been developed over the last several years to actually measure "sparkle" of effect pigments. One example of such a measuring device is the Byk-mac from Byk-Gardner GmbH (Lausitzer Straβe 8, 82538 Geretsried, Germany). This device allows measurement of sparkle and graininess for flake characterization. Sparkle Grade (S_G) is a function of the following two parameters: Sparkling area (S_a) corresponds to the number of light reflections within the measuring given; and Sparkling intensity (S_i) corresponds the intensity of the light reflections.

The most common sparkling effect pigments are based on metal oxide coated mica or synthetic mica with as average particle size over 40 μm, as well as metal oxide coated glass flakes or metal oxide coated alumina flakes. Such effect pigments generally provide desirable sparkling effect.

Perlite flakes, as used herein, are hydrated natural glass flakes containing typically about 72-75% $SiO_2$, 12-14% $Al_2O_3$, 0.5-2% $Fe_2O_3$, 3-5% $Na_2O$, 4-5% $K_2O$, 0.4-1.5% CaO (by weight), and small concentrations of other metallic elements. Perlite flakes are distinguished from other natural glasses by a higher content (2-10% by weight) of chemically bonded water, the presence of a vitreous, pearly luster, and characteristic concentric or arcuate onion skin-like (i.e., perlitic) fractures. Perlite flakes may be prepared by methods disclosed in WO02/11882 which may include milling, screening, and thermal expansion. Perlite flakes with controlled particle size distribution, low floater content, and high blue light brightness are preferred.

Perlite flakes having a median particle size of less than about 50 microns are preferred. Perlite flakes having a median particle size of from about 15 to about 50 microns are preferred and perlite flakes having a median particle size of from about 20 to about 40 microns are most preferred.

The perlite flakes used in the present invention are not of a uniform shape. Nevertheless, for purposes of brevity, the perlite flakes will be referred to as having a "diameter". The perlite flakes have an average thickness of <about 2 µm, especially of from about 200 to about 1000 nm, especially from about 200 to about 600 nm. It is presently preferred that the diameter (median particle size ($d_{50}$)) of the flakes be in a preferred range of about 15-50 µm with a more preferred range of about 20-40 µm.

The perlite flakes have a floater content of less than 10 percent by volume; especially a floater content of less than 5 percent by volume; very especially a floater content of less than 2 percent by volume. The perlite flakes have a blue light brightness greater than 80; especially greater than 82; very especially greater than 85.

A preferred perlite is OPTIMAT™ 2550 (matting agent by World Minerals). Perlites, like OPTIMAT™ 1735 (matting agent by World Minerals) could also be used, if particles having a particle size below 10 µm are removed, for example, by sedimentation, or centrifugation.

A method of making coated perlite flakes is provided herein. The method comprising: (i) providing perlite flakes; (ii) applying a layer of tin oxide on the perlite flakes to obtain tin oxide coated perlite flakes; (iii) applying a layer titanium dioxide on the tin oxide coated perlite flakes obtained in step (ii) to obtain titanium dioxide and tin oxide coated perlite flakes; and (iv) applying a layer of iron oxide to the titanium dioxide and tin oxide coated perlite flakes to obtain the coated perlite flakes.

Step (i) of providing perlite flakes in the above method comprises: selecting perlite flakes with a mean particle diameter $D_{50}$ in the range of from about 1 µm to about 1000 µm, preferably from about 10 µm to about 500 µm, more preferably from about 10 µm to about 100 µm, even more preferably from about 15 µm to about 50 µm, and most preferably from about 20 µm to about 40 µm.

The amount of the tin oxide applied in step (ii) is from about 0.5 wt % to about 5 wt % based on the total weight of the coated perlite flake. The amount of the titanium dioxide applied in step (iii) is from about 0.5 wt % to about 50 wt % based on the total weight of the coated perlite flake. The amount of the iron oxide applied in step (iv) is from about 0.5 wt % to about 50 wt % based on the total weight of the coated perlite flake.

The thickness of the tin oxide layer applied in step (ii) is from about 1 nm to about 10 nm. The thickness of the titanium dioxide layer applied in step (iii) is from about 1 nm to about 150 nm. The thickness of the iron oxide layer applied in step (iv) is from about 1 nm to about 150 nm.

Coated perlite flakes are provided herein. The coated perlite flakes comprise perlite flakes with layer of tin oxide, then a layer of titanium dioxide, and then a layer of iron oxide.

The coated perlite flakes described herein can be used in (i) paints, (ii) ink jet printing, (iii) for dyeing textiles, (iv) for pigmenting coatings, (v) printing inks, (vi) plastics, (vii) cosmetics, or (viii) glazes for ceramics and glass.

The coated perlite flakes described herein have a Sparkle Grade (S_G) of at least about 3.9, more preferably between about 3.9 and about 10, and most preferably between about 3.9 and about 7, as measured with a BYK-mac.

A desirable sparkle effect for the purposes of the present invention is a Sparkle Grade (S_G) of at least about 3.9 as measured with a BYK-mac.

The perlite used herein is commercially available as, for example, OPTIMAT™ 2550 (matting agent by World Minerals). The perlite flakes are then classified to an optimal particle size for the desired sparkle effect and then coated with tin oxide, titanium dioxide and iron oxide. This classification of perlite flakes comprises selecting perlite flakes with a mean particle diameter $D_{50}$ in the range of from about 1 µm to about 1000 µm, preferably from about 10 µm to about 500 µm, more preferably from about 10 µm to about 100 µm, even more preferably from about 15 µm to about 50 µm, and most preferably from about 20 µm to about 40 µm. Classification is conducted by gravity separation in a water slurry. In a laboratory setting, classification can be conducted by settling and in a production facility classification can be conducted with a centrifuge. Other methods for classification such as screening and air classification can be used as well.

In one embodiment, the coated perlite flakes are prepared by the following method. A slurry of perlite flakes having an average particle size about 10-50 microns (preferably about 30 microns) mixed with water is heated to a temperature of from about 70° C. to about 100° C. (preferably from about 80° C. to about 85° C.) and the pH is adjusted to about 1.5 with an acid such as HCl. A solution of a tin salt (e.g., $SnCl_4$) is then added with a base such as NaOH in order to maintain the pH. After stirring for about 60 minutes, a titanium salt (e.g., $TiCl_4$) solution is added with a base such as NaOH to maintain the pH. A base such as NaOH is then used to raise the pH to about 3.0 before a solution of an iron salt (e.g., $FeCl_3$) is added with a base such as NaOH to maintain the pH. After addition of the iron salt (e.g., $FeCl_3$), the slurry is filtered, washed, and calcined at from about 500° C. to about 1000° C., more preferably from about 700° C. to about 900° C., and most preferably about 850° C. to obtain the coated perlite flakes of the present invention.

Conventional methods of coating iron oxide directly onto mica cannot be used for perlite because the iron oxide does not deposit onto the perlite surface.

It has been unexpectedly found that a tin oxide layer aids in the deposition of iron oxide onto perlite. It has also been found that the iron oxide coating easily strips off of the perlite flakes. It is believed that the iron oxide coating is prone to stripping due to weak bonds formed between the iron oxide and the surface of the perlite flakes. These weak bonds are put under thermal stress with the calcination temperature during manufacturing which strips the iron oxide off of the perlite flakes. It has been found that upon changing processing conditions including using lower calcination temperatures, minimal resolution of the stripping problem is achieved. However, it has been found that the stripping problem was resolved once tin oxide, then titanium dioxide, and then iron oxide were coated onto the perlite flakes.

Depending on the amount of titanium dioxide and iron oxide used, a series of colors can be produced from gold, to bronze, copper and russet (see Examples).

The coated perlite flakes of the present invention with metallic like colors and a sparkle effect can be used in decorative coatings to produce antique effect coatings. Metallic like colors means that the pigments provide a color effect that looks like a metal such as gold, bronze, and copper.

In some embodiments, the metal oxide layers can be applied by CVD (chemical vapor deposition) or by wet chemical coating. The metal oxide layers can be obtained by decomposition of metal carbonyls in the presence of water vapor (relatively low molecular weight metal oxides such as magnetite) or in the presence of oxygen and, where appropriate, water vapor (e.g., nickel oxide and cobalt oxide). The metal oxide layers are especially applied by means of oxidative gaseous phase decomposition of metal carbonyls (e.g., iron pentacarbonyl, chromium hexacarbonyl; EP-A-45851), by means of hydrolytic gaseous phase decomposition of metal alcoholates (e.g., titanium and zirconium tetra-n- and -iso-propanolate; DE-A-4140900) or of metal halides (e.g., titanium tetrachloride; EP-A-338428), by means of oxidative decomposition of organyl tin compounds (especially alkyl tin compounds such as tetrabutyltin and tetramethyltin; DE-A-4403678) or by means of the gaseous phase hydrolysis of organyl silicon compounds (especially di-tert-butoxyacetoxysilane) described in EP-A-668329, it being possible for the coating operation to be carried out in a fluidised-bed reactor (EP-A-045851 and EP-A-106235). $Al_2O_3$ layers (B) can advantageously be obtained by controlled oxidation during the cooling of aluminum-coated pigments, which is otherwise carried out under inert gas (DE-A-19516181).

Layers of oxides of titanium, iron, and tin are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-1467468, DE-A-1959988, DE-A-2009566, DE-A-2214545, DE-A-2215191, DE-A-2244298, DE-A-2313331, DE-A-2522572, DE-A-3137808, DE-A-3137809, DE-A-3151343, DE-A-3151354, DE-A-3151355, DE-A-3211 602 and DE-A-3235017, DE1959988, WO93/08237, WO98/53001 and WO93/6558.

Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A-4125134, EP-A-332071, EP-A-707,050, WO93/19131, or WO06/131472.

For the purpose of coating, the substrate particles (i.e., perlite flakes) are suspended in water and one or more hydrolysable metal salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments (i.e., coated perlite flakes) are then separated off, washed, dried and, where appropriate, calcinated, it being possible to optimize the calcinating temperature with respect to the coating in question. If desired, after individual coatings have been applied, the pigments can be separated off, dried and, where appropriate, calcinated, and then again re-suspended for the purpose of precipitating further layers.

The metal oxide layers are also obtainable, for example, in analogy to a method described in DE-A-19501307, by producing the metal oxide layer by controlled hydrolysis of one or more metal acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxypropylamine. The organic solvent is a water-miscible organic solvent such as a $C_{1-4}$alcohol, especially isopropanol.

Suitable metal acid esters are selected from alkyl and aryl alcoholates, carboxylates, and carboxyl-radical- or alkyl-radical- or aryl-radical-substituted alkyl alcoholates or carboxylates of titanium, iron, and tin. The use of triisopropyl aluminate, tetraisopropyl titanate, tetraisopropyl zirconate, tetraethyl orthosilicate and triethyl borate is preferred. In addition, acetylacetonates and acetoacetylacetonates of the afore-mentioned metals may be used. Preferred examples of that type of metal acid ester are titanium acetylacetonate and diisobutyloleyl acetoacetylaluminate or diisopropyloleyl acetoacetylacetonate and mixtures of metal acid esters.

The oxide layers on the perlite flakes can optionally be reduced by usual procedures: U.S. Pat. No. 4,948,631 ($NH_3$, 750-850° C.), WO93/19131 ($H_2$, >900° C.) or DE-A-19843014 (solid reduction agent, such as, for example, silicon, >600° C.).

It is also possible to modify the powder color of the pigment by applying further layers such as, for example, colored metal oxides or Berlin Blue, compounds of transition metals, e.g., Fe, Cu, Ni, Co, Cr, or organic compounds such as dyes or color lakes.

To enhance the weather and light stability the (multilayer) perlite flakes can be, depending on the field of application, subjected to a surface treatment. Useful surface treatments are, for example, described in DE-A-2215191, DE-A-3151354, DE-A-3235017, DE-A-3334598, DE-A-4030727, EP-A-649886, WO97/29059, WO99/57204, and U.S. Pat. No. 5,759,255. The surface treatment may facilitate the handling of the pigment, especially its incorporation into various compositions for various applications.

Depending on the conditioning method or intended application, it may be advantageous to add certain amounts of texture-improving agents to the effect pigment before or after the conditioning process, provided that this has no adverse effect on use of the effect pigments for coloring various compositions for various applications. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The effect pigments (i.e., the coated perlite flakes) can be added in any tinctorially effective amount to the substance being pigmented. A pigmented substance composition can comprise from 0.01 to 80% by weight or preferably from 0.1 to 30% by weight of the effect pigments based on the total weight of the pigmented substance composition. High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

Depending on the application, any desired amounts of other color-imparting constituents, such as white, colored, black or effect pigments can be added in addition to the effect pigments according to the invention in order to achieve different hues or color effects. When colored pigments are used in admixture with the effect pigments according to the invention, the total amount is preferably from 0.1 to 10% by weight, based on the total weight of the composition being pigmented. Especially high goniochromicity is provided by the preferred combination of an effect pigment according to the invention with a colored pigment of another color, especially of a complementary color, with colorations made using the effect pigment and colorations made using the colored pigment having, at a measurement angle of 10 degrees, a difference in hue ($\Delta H^*$) of from about 20 to about 340, especially from about 150 to about 210.

Preferably, the effect pigments according to the invention are combined with transparent colored pigments, it being possible for the transparent colored pigments to be present either in the same medium as the effect pigments according to the invention or in a neighboring medium. An example of an arrangement in which the effect pigment and the colored pigment are advantageously present in neighboring media is a multi-layer effect coating.

The pigmenting of a composition with the effect pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression molding, extrusion, coating, pouring or injection molding. Any additives customary in the plastics industry, such as plasticisers, fillers or stabilizers, can be added to the polymer, in customary amounts, before or after incorporation of the pigment.

For pigmenting compositions such as coatings and printing inks, the effect pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an effect pigment according to the invention in a composition being pigmented, and processing a pigment composition according to the invention, are preferably carried out subject to conditions under which only relatively weak shear forces occur so that the effect pigment is not broken up into smaller portions.

Plastics comprising the pigment of the invention in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The coated perlite flakes of the present invention can be used in any application where effect pigments have been used heretofore. Thus, the products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, the coated perlite flakes of the present invention can be used on all clay/formica/wood/glass/metal/enamel/ceramic and non-porous or porous surfaces.

When the composition being pigmented by the coated perlite flakes of the present invention is a coating, it is especially a specialty coating, very especially an automotive finish.

The coated perlite flakes of the present invention can also be used in powder coating compositions. They can be incorporated into plastic articles geared for the toy industry or the home. These effect pigments can be impregnated into fibers to impart new and esthetic coloring to clothes and carpeting. The coated perlite flakes of the present invention can be used to improve the look of shoes, rubber and vinyl/marble flooring, vinyl siding, and all other vinyl products.

The coated perlite flakes of the present invention can be used in various compositions, such as, printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a fairly comprehensive discussion regarding a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282-591; with regard to paints: C. H. Hare, Protective Coatings, Technology Publishing Co., Pittsburgh (1994), particularly pages 63-288. The foregoing references are hereby incorporated by reference herein for their teachings of ink, paint and plastic compositions, formulations and vehicles in which the compositions of this invention may be used including amounts of colorants. For example, the coated perlite flakes of the present invention may be used at a level of 10 to 15% in an offset lithographic ink, with the remainder being a vehicle containing gelled and ungelled hydrocarbon resins, alkyd resins, wax compounds and aliphatic solvent. The coated perlite flakes of the present invention may also be used, for example, at a level of 1 to 10% in an automotive paint formulation along with other pigments which may include titanium dioxide, acrylic lattices, coalescing agents, water or solvents. The coated perlite flakes of the present invention may also be used, for example, at a level of 20 to 30% in a plastic color concentrate in polyethylene.

The effect pigments according to the invention are also suitable for making-up the lips or the skin and for coloring the hair or the nails. The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation. Such cosmetic preparations or formulations are, for example, lipsticks, blushers, foundations, nail varnishes and hair shampoos. The pigments in cosmetic preparations or formulations may be used singly or in the form of mixtures. It is, in addition, possible to use pigments according to the invention together with other pigments and/or colorants, for example in combinations as described hereinbefore or as known in cosmetic preparations. The cosmetic preparations and formulations according to the invention preferably contain the pigment according to the invention in an amount from 0.005 to 50% by weight, based on the total weight of the preparation. Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eye-liners, powder or nail varnishes. If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecane-oxypolysiloxane and poly(dimethylsiloxy)stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminum. The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from about 310° C. to about 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol. The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-colored polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances. A lipophilic functional cosmetic active ingredient suitable for skin cosmetics, an active ingredient composition or an active ingredient extract is an ingredient or a mixture of ingredients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorizing and perspiration-inhibiting action:

they include antiperspirants based on aluminum salts or zinc salts, deodorants comprising bactericidal or bacteriostatic deodorizing substances, for example triclosan, hexachlorophene, alcohols and cationic substances, such as, for example, quaternary ammonium salts, and odor absorbers, for example Grillocin® (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers);

suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenylbenzimidazolesulfonic acid and salts thereof, menthyl anthranilates, benzotriazole derivatives, and/or an inorganic micropigment selected from aluminum oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York, 1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturizing substances: the following substances, for example, are used as moisture-controlling agents (moisturizers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation. If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes. If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier. Such ointments and creams may also comprise further conventional additives, such as, for example, perfumes, antioxidants, preservatives, gel-forming agents, UV filters, colorants, pigments, pearlescent agents, non-colored polymers as well as inorganic or organic fillers. If the preparations are in the form of a powder, they consist substantially of a mineral or inorganic or organic filler such as, for example, talcum, kaolin, starch, polyethylene powder or polyamide powder, as well as adjuvants such as binders, colorants etc. Such preparations may likewise comprise various adjuvants conventionally employed in cosmetics, such as fragrances, antioxidants, preservatives etc. If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents. In that embodiment, the colored polymer is present in an amount of approximately from 0.1 to 5% by weight. The cosmetic preparations and formulations according to the invention may also be used for coloring the hair, in which case they are used in the form of shampoos, creams or gels that are composed of the base substances conventionally employed in the cosmetics industry and a pigment according to the invention. The cosmetic preparations and formulations according to the invention are prepared in conventional manner, for example by mixing or stirring the components together, optionally with heating so that the mixtures melt.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

Example 1

A slurry of 215 g of perlite (average particle size 30 microns) in 1785 mL of distilled water was heated to 83° C. and the pH was adjusted to 1.4 with HCl. A 50 g solution of 20% $SnCl_4$ was then added at 3.2 g/min with NaOH used to maintain the pH. After stirring for 60 minutes, 36 g of a 40% $TiCl_4$ solution was added at 3 g/min with NaOH used to maintain the pH. NaOH was then used to raise the pH to 3.0 before a solution of 39% $FeCl_3$ was added at 1.2 g/min with NaOH use to maintain the pH. After 320 g of $FeCl_3$ added, the slurry was filtered, washed, and calcined at 850° C. The resulting product had a bronze color shown in FIG. 1.

Example 2

Figure 2:
FIG. 2 is an optical micrograph showing well coated perlite flakes of Example 2.

This example was run like Example 1 except that 335 g of $FeCl_3$ were added. The resulting product had a copper interference color shown in FIG. 2.

Example 3

Figure 3:
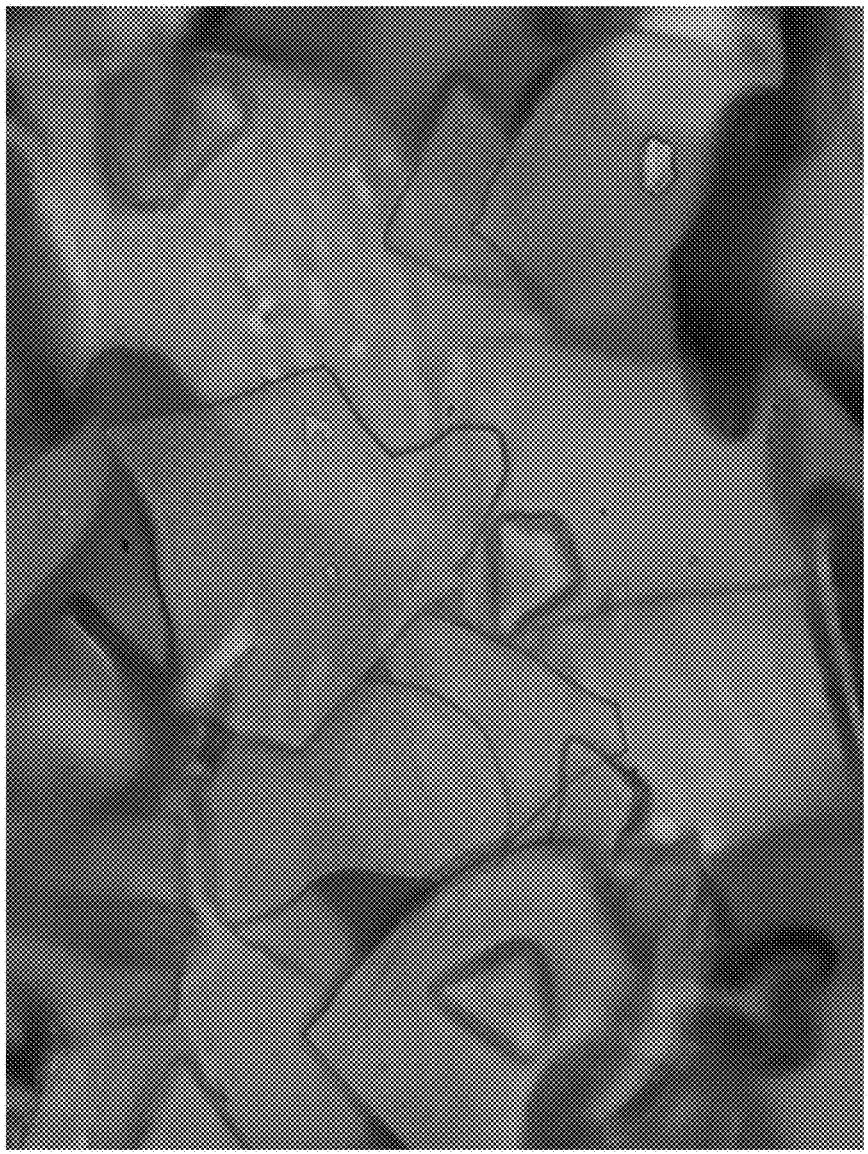
FIG. 3 is an optical micrograph showing well coated perlite flakes of Example 3.

This example was run like Example 1 except that 360 g of $FeCl_3$ were added. The resulting product had a russet interference color shown in FIG. 3.

Comparative Example 4

Figure 4:
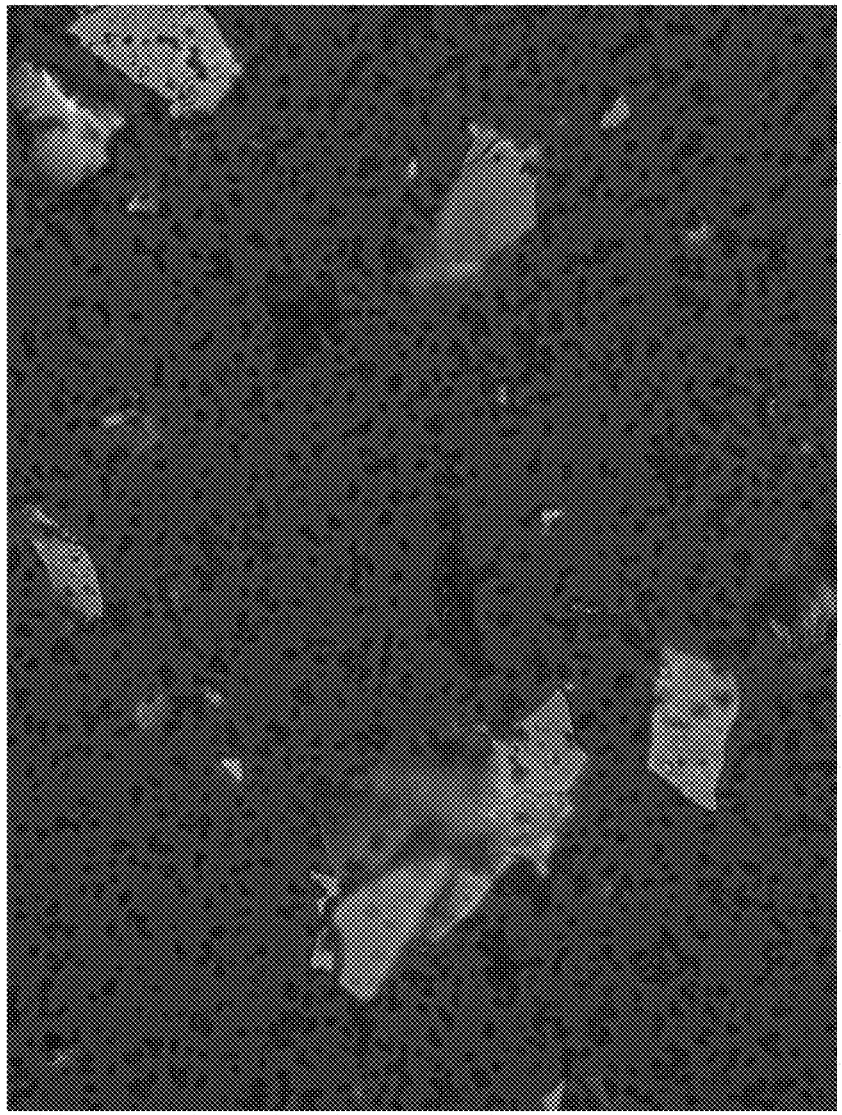
FIG. 4 is an optical micrograph showing poorly coated perlite flakes of Comparative Example 4

A slurry of 125 g of perlite (average particle size 30 microns) in 2606 mL of distilled water was heated to 80° C. and the pH was adjusted to 3.0 with HCl. A 206 g solution of 39% $FeCl_3$ was added at 1.6 mL/min with NaOH use to maintain the pH. The slurry was filtered, washed, and calcined at 650° C. The resulting product had a bronze color, but the $Fe_2O_3$ was mostly precipitated next to the perlite flakes, rather than as a coating on the perlite. This is shown in FIG. 4.

Comparative Example 5

Figure 5:
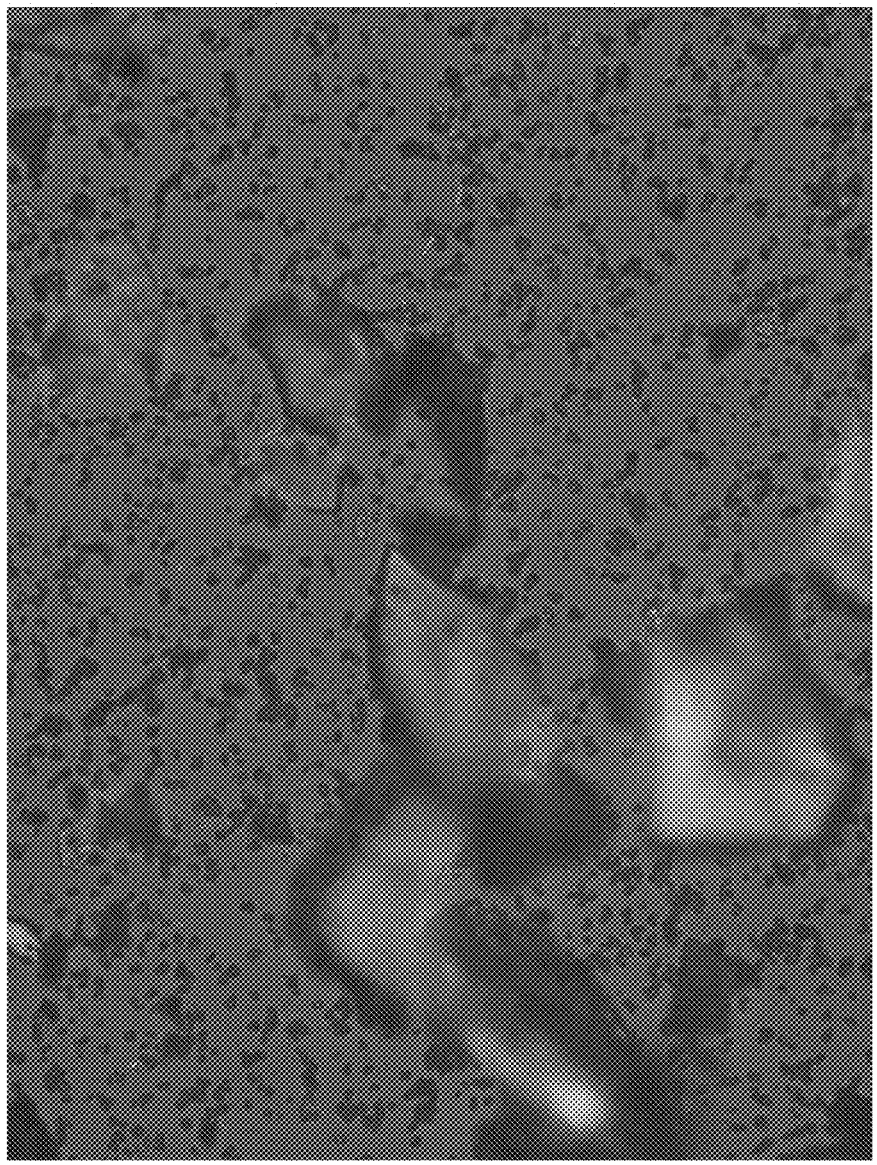
FIG. 5 is an optical micrograph showing poorly coated perlite flakes of Comparative Example 5.

This example was run as in Example 4 but with 240 g of 39% $FeCl_3$ added. The resulting product had a russet color, but the Fe2O3 was mostly precipitated next to the perlite flakes, rather than as a coating on the perlite. This is shown in FIG. 5.

Comparative Example 6

Figure 6:
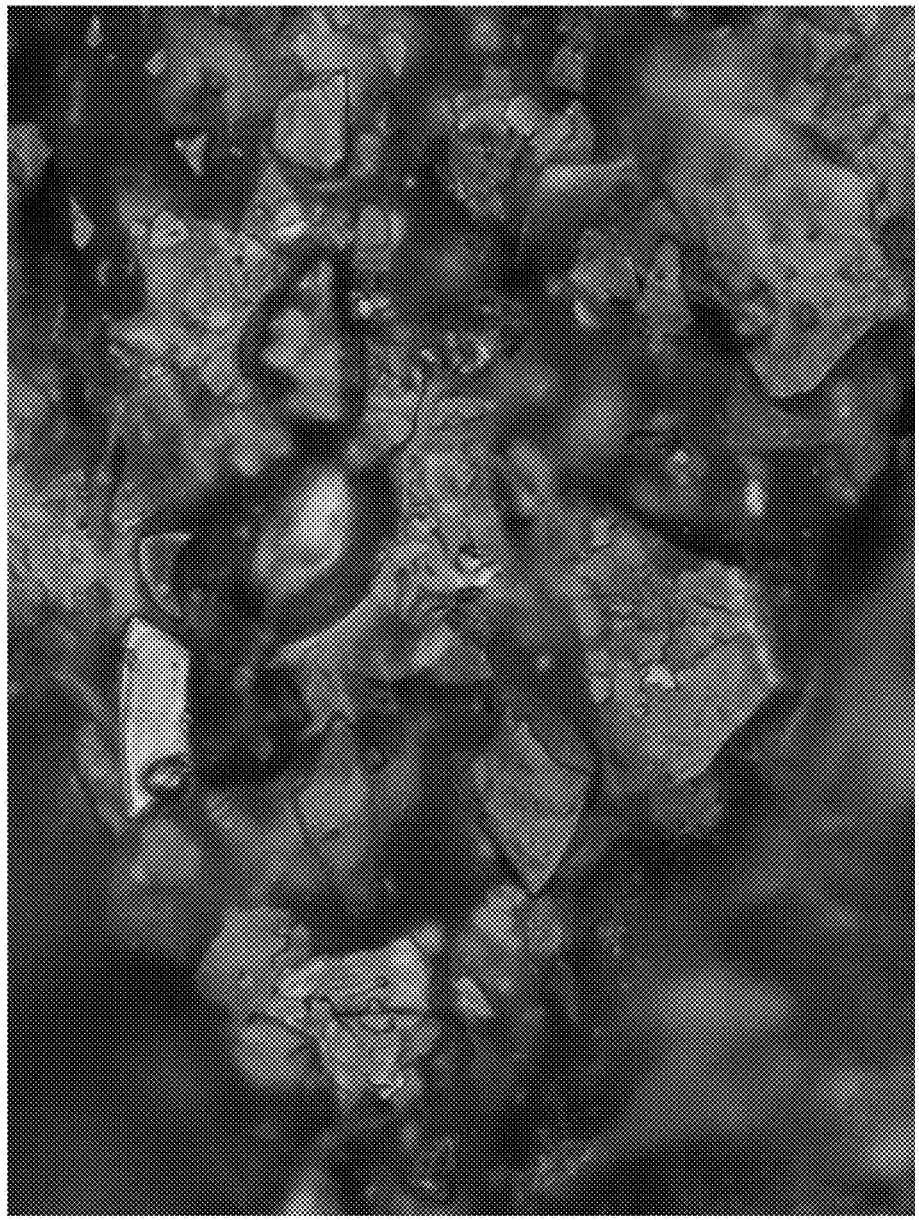
FIG. 6 is an optical micrograph showing perlite flakes not using a $TiO_2$ layer resulting in cracking and flaking off of coating of Comparative Example 6.

A slurry of 183 g of perlite (average particle size 30 microns) in 1817 mL of distilled water was heated to 74° C. and the pH was adjusted to 1.5 with HCl. A 51 g solution of 20% SnCl$_4$ was then added at 0.8 g/min with NaOH used to maintain the pH. After stirring for 30 minutes, NaOH was used to raise the pH to 3.2 before a solution of 39% FeCl$_3$ was added at 0.56 g/min with NaOH use to maintain the pH. After 466 g of FeCl$_3$ added, the slurry was filtered, washed, and calcined at 850° C. The resulting product had a russet color. When formulated into a decorative coating, much of Fe$_2$O$_3$ coating was cracked and flaked off of the perlite surface. This is shown in FIG. 6.

Example 7

A slurry of 125 g of perlite (average particle size 30 microns) in 1250 mL of distilled water was heated to 80° C. and the pH was adjusted to 1.4 with HCl. A 58.75 g solution of 20% SnCl$_4$ was then added at 1.77 mL/min with NaOH used to maintain the pH. After stirring for 30 minutes, 209 g of a 40% TiCl$_4$ solution was added at 1.6 mL/min with NaOH used to maintain the pH. NaOH was then used to raise the pH to 3.2 before 10 g of a solution of 39% FeCl$_3$ was added at 1.0 g/min with NaOH use to maintain the pH. A small sample of the slurry was filtered, washed, and calcined at 850° C. The 10 g addition and sampling was repeated 7 more times. A series of products with colors ranging from a light sand color through to a golden orange were created.

Example 8

Figure 7:
FIG. 7 is an optical micrograph showing well coated perlite flakes of Example 8.

A slurry of 180 g of perlite (average particle size 30 microns) in 1820 mL of distilled water was heated to 80° C. and the pH was adjusted to 1.4 with HCl. A 40 g solution of 20% SnCl$_4$ was then added at 2.57 mL/min with NaOH used to maintain the pH. After stirring for 30 minutes, 300 g of a 40% TiCl$_4$ solution was added at 2.44 mL/min with NaOH used to maintain the pH. NaOH was then used to raise the pH to 3.2 before 55 g of a solution of 39% FeCl$_3$ was added at 1.28 mL/min with NaOH use to maintain the pH. The slurry was filtered, washed, and calcined at 850° C. The resulting product had a gold color shown in FIG. 7.

Results

For the color data:
L*=lightness;
C*=chroma;
H°=hue; and
S_G=Sparkle Grade.

All measured with a BYK-mac measured at 15 degrees.

The L*, C*, H°, and S_G values for all examples discussed hereinabove are provided below in Table 1.

TABLE 1

| Example | L* | C* | H° | S_G |
| --- | --- | --- | --- | --- |
| 1 | 81.4 | 42.6 | 61.6 | 6.29 |
| 2 | 65.9 | 40.7 | 46.3 | 5.84 |
| 3 | 63.1 | 32.0 | 24.5 | 3.98 |
| Comparative 4 | N/A[1] | N/A[1] | N/A[1] | N/A[1] |
| Comparative 5 | N/A[1] | N/A[1] | N/A[1] | N/A[1] |
| Comparative 6 | 71.8 | 30.2 | 23.3 | 3.4 |
| 7 | See Table 2 below | See Table 2 below | See Table 2 below | See Table 2 below |
| 8 | 92.27 | 48.48 | 79.55 | 5.30 |

[1]No color measurement data was obtained for Comparative Examples 4 and 5 because the perlite flakes did not form good coatings.

The color data for the sample series in Example 7 is provided below in Table 2.

TABLE 2

| Sample | L* | C* | H° | S_G |
| --- | --- | --- | --- | --- |
| a | 86.60 | 16.88 | 100.15 | 4.87 |
| b | 86.00 | 22.94 | 96.70 | 5.09 |
| c | 84.64 | 29.32 | 93.27 | 4.97 |
| d | 82.57 | 33.92 | 90.02 | 5.17 |
| e | 81.38 | 38.33 | 86.34 | 4.90 |
| f | 78.74 | 39.28 | 81.74 | 4.71 |
| g | 74.81 | 37.55 | 75.70 | 4.57 |
| h | 72.50 | 34.59 | 67.47 | 4.09 |

As shown hereinabove, the coated perlite flakes of the present invention (see Examples 1-3, 7, and 8) provide highly desirable L, C, H, and S_G values when compared to what is known in the art (see Comparative Examples 4-6). More particularly, the S_G values for the desirable coated perlite flakes of the present invention are at least 3.9.

What is claimed is:

1. A method of making coated perlite flakes comprising:
   (i) providing perlite flakes;
   (ii) applying a layer of tin oxide on the perlite flakes to obtain tin oxide coated perlite flakes;
   (iii) applying a layer titanium dioxide on the tin oxide coated perlite flakes obtained in step (ii) to obtain titanium dioxide and tin oxide coated perlite flakes; and
   (iv) applying a layer of iron oxide to the titanium dioxide and tin oxide coated perlite flakes to obtain the coated perlite flakes.

2. The method of claim 1, wherein step (i) of providing perlite flakes comprises:
   selecting perlite flakes with a mean particle diameter D$_{50}$ in the range of from about 1 μm to about 1000 μm.

3. The method of claim 1, wherein the amount of the tin oxide applied in step (ii) is from about 0.5 wt % to about 5 wt % based on the total weight of the coated perlite flake.

4. The method of claim 1, wherein the amount of the titanium dioxide applied in step (iii) is from about 0.5 wt % to about 50 wt % based on the total weight of the coated perlite flake.

5. The method of claim 1, wherein the amount of the iron oxide applied in step (iv) is from about 0.5 wt % to about 50 wt % based on the total weight of the coated perlite flake.

6. The method of claim 1, wherein the thickness of the tin oxide layer applied in step (ii) is from about 1 nm to about 10 nm.

7. The method of claim 1, wherein the thickness of the titanium dioxide layer applied in step (iii) is from about 1 nm to about 150 nm.

8. The method of claim 1, wherein the thickness of the iron oxide layer applied in step (iv) is from about 1 nm to about 150 nm.

9. The coated perlite flakes obtained from the method of claim 1.

10. A composition comprising the coated perlite flakes of claim 9.

11. A method of utilizing the coated perlite flakes of claim 9 in (i) paints, (ii) ink-jet printing, (iii) for dyeing textiles, (iv) for pigmenting coatings, (v) printing inks, (vi) plastics, (vii) cosmetics, or (viii) glazes for ceramics and glass.

12. Paints, printing inks, plastics, cosmetics, ceramics and glass, which are pigmented with the coated perlite flakes of claim 9.

13. Coated perlite flakes comprising:
   perlite flakes with layer of tin oxide, then a layer of titanium dioxide, and then a layer of iron oxide.

14. The coated perlite flakes of claim 13, wherein the perlite flakes have a mean particle diameter $D_{50}$ in the range of from about 1 µm to about 1000 µm.

15. The coated perlite flakes of claim 13, wherein the amount of the tin oxide on the perlite flakes is from about 0.5 wt % to about 5 wt %.

16. The coated perlite flakes of claim 13, wherein the amount of the titanium dioxide on the perlite flakes is from about 0.5 wt % to about 50 wt % based on the total weight of the coated perlite flake.

17. The coated perlite flakes of claim 13, wherein the amount of the iron oxide on the perlite flakes is from about 0.5 wt % to about 50 wt % based on the total weight of the coated perlite flake.

18. The coated perlite flakes of claim 13, wherein the thickness of the tin oxide layer is from about 1 nm to about 10 nm.

19. The coated perlite flakes of claim 13, wherein the thickness of the titanium dioxide layer is from about 1 nm to about 150 nm.

20. The coated perlite flakes of claim 13, wherein the thickness of the iron oxide layer is from about 1 nm to about 150 nm.

21. The coated perlite flakes of claim 13 have a sparkle grade (S_G) of at least about 3.9 as measured with a BYK-mac.

22. The coated perlite flakes of claim 21 have a sparkle grade (S_G) of from about 3.9 to about 7 as measured with a BYK-mac.

23. A composition comprising the coated perlite flakes of claim 13.

24. A method of making coated perlite flakes comprising:
(i) preparing a slurry of water and perlite flakes having a $D_{50}$ in the range of 10 µm to 50 µm;
(ii) heating the slurry obtained in step (i) to a temperature of from about 70° C. to about 100° C. and adjusting the pH of the slurry to between about 1 and 3;
(iii) after step (ii), adding a solution of a tin salt to the slurry while maintaining the pH at between about 1 and 4;
(iv) after step (iii), stirring the slurry for at least 30 minutes;
(v) after step (iv), adding a titanium salt solution to the slurry while maintaining the pH between about 1 and 4;
(vi) after step (v), adding a solution of an iron salt to the slurry while maintaining the pH at between about 1 and 4; and
(vii) after step (vi), filtering, then washing, and then calcining the slurry at from about 500° C. to about 1000° C. to obtain the coated perlite flakes.

25. The coated perlite flakes obtained from the method of claim 24.

26. A composition comprising the coated perlite flakes of claim 25.

27. The composition of claim 26 selected from (i) a paint composition, (ii) an ink-jet printing composition, (iii) a textile dyeing composition, (iv) a coating composition, (v) a printing ink composition, (vi) a plastic composition, (vii) a cosmetic composition, or (viii) a glaze for ceramics and glass composition.

* * * * *